(12) United States Patent
Omura

(10) Patent No.: US 7,554,547 B2
(45) Date of Patent: Jun. 30, 2009

(54) PROCESSING METHOD, PROCESSING APPARATUS, AND COMPUTER PROGRAM PRODUCT

(75) Inventor: Mari Omura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 11/147,428

(22) Filed: Jun. 8, 2005

(65) Prior Publication Data

US 2005/0225560 A1 Oct. 13, 2005

Related U.S. Application Data

(63) Continuation of application No. PCT/JP02/13111, filed on Dec. 13, 2002.

(51) Int. Cl.
*G06T 11/20* (2006.01)
(52) U.S. Cl. ...................... 345/442; 382/316
(58) Field of Classification Search ................ 345/442; 382/316

See application file for complete search history.

(56) References Cited

U.S. PATENT DOCUMENTS

| | | | |
|---|---|---|---|
| 4,847,788 A * | 7/1989 | Shimada ...................... 345/634 |
| 4,933,865 A * | 6/1990 | Yamamoto et al. .......... 382/203 |
| 5,138,697 A * | 8/1992 | Yamamoto et al. .......... 345/420 |
| 5,231,695 A * | 7/1993 | Harrington .................. 345/621 |
| 5,303,340 A * | 4/1994 | Gonzalez-Lopez et al. .. 345/441 |
| 5,375,194 A * | 12/1994 | Hori et al. .................... 345/611 |
| 5,412,742 A * | 5/1995 | Takasaki et al. ............. 382/316 |
| 5,485,559 A * | 1/1996 | Sakaibara et al. ........... 345/505 |
| 5,537,490 A * | 7/1996 | Yukawa ....................... 382/197 |
| 5,671,293 A * | 9/1997 | Niki ............................ 382/224 |
| 6,169,554 B1 * | 1/2001 | Deering ....................... 715/764 |
| 6,356,648 B1 * | 3/2002 | Taguchi ....................... 382/111 |
| 6,356,657 B1 * | 3/2002 | Takaoka et al. ............. 382/197 |
| 6,466,694 B2 * | 10/2002 | Kamada et al. ............. 382/181 |

(Continued)

FOREIGN PATENT DOCUMENTS

JP 3-1278 1/1991

(Continued)

OTHER PUBLICATIONS

Office Action issued in corresponding Japanese Patent Application No. 2004-560562, mailed on Jun. 5, 2007.

*Primary Examiner*—Javid A Amini
(74) *Attorney, Agent, or Firm*—Staas & Halsey LLP

(57) ABSTRACT

The graphic elements which constitutes a graphic data created by a CAD system for processing the graphic data displaying a graphic formed by combining the graphic elements are sorted into separate attributes consisting of graphic type, color, line type, line width, and the like while are represented by coordinate which indicates the position to be located and configuration as well as by a range coordinate and recorded in comparison files which include tables where each attribute is assigned with the coordinate data. Accordingly, the comparison files can be used with higher effectiveness for comparing the graphic data between the different formats. Also, as the identity of graphic data is judged through the comparison in the number of tables and the number of graphic elements with respect to the attributes, the number of items to be compared will be decreased. Moreover, as the number to be compared is an integer but not a real number by which the coordinate is represented, the processing load such as processing time can be reduced in comparison to compare real number coordinates.

9 Claims, 7 Drawing Sheets

U.S. PATENT DOCUMENTS

| | | | |
|---|---|---|---|
| 6,498,607 B1 * | 12/2002 | Pfister et al. | 345/423 |
| 6,597,363 B1 * | 7/2003 | Duluk et al. | 345/506 |
| 6,858,007 B1 * | 2/2005 | Akselrod et al. | 600/437 |
| 6,975,425 B1 * | 12/2005 | Abe et al. | 358/1.18 |
| 6,996,793 B1 * | 2/2006 | Kronmiller et al. | 716/9 |
| 2001/0014176 A1 * | 8/2001 | Kamada et al. | 382/181 |
| 2001/0033281 A1 * | 10/2001 | Yoshida et al. | 345/420 |

FOREIGN PATENT DOCUMENTS

| | | |
|---|---|---|
| JP | 4-98470 | 3/1992 |
| JP | 4-270476 | 9/1992 |
| JP | 5-151350 | 6/1993 |
| JP | 7-28866 | 1/1995 |
| JP | 7-320065 | 12/1995 |
| JP | 8-272972 | 10/1996 |
| JP | 8-320944 | 12/1996 |
| JP | 10-269259 | 10/1998 |

* cited by examiner

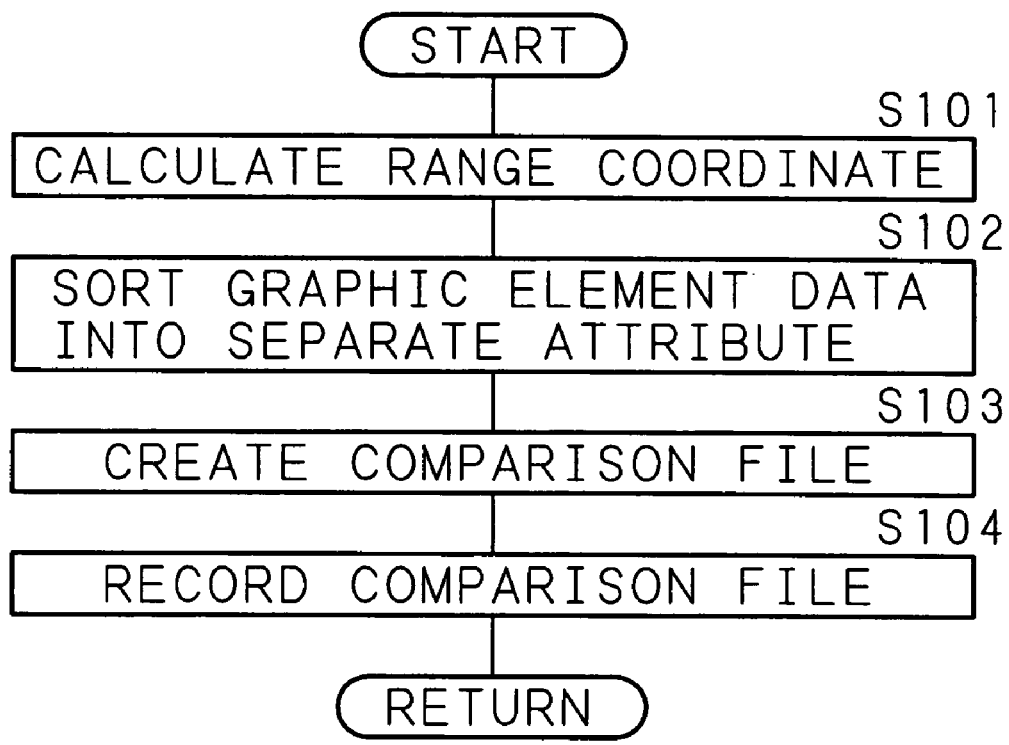

FIG. 4A

| ATTRIBUTE | GRAPHIC TYPE : CURVILINEAR LINE<br>COLOR : YELLOW<br>LINE TYPE : BROKEN LINE<br>LINE WIDTH : 0.8 |
|---|---|
| RANGE COORDINATE | LOCATION COORDINATE |
| (x1, y1), (x2, y2) | (x01, y01), (x02, y02), (x03, y03), ⋯ |
| (x3, y3), (x4, y4) | (x11, y11), (x12, y12), (x13, y13), ⋯ |
| ⋮ | ⋮ |

FIG. 4B

| ATTRIBUTE | GRAPHIC TYPE : SEGMENT<br>COLOR : BLUE<br>LINE TYPE : SOLID LINE<br>LINE WIDTH : 1.0 |
|---|---|
| RANGE COORDINATE | LOCATION COORDINATE |
| (x5, y5), (x6, y6) | (x5, y5), (x6, y6) |
| (x7, y7), (x8, y8) | (x7, y7), (x8, y8) |
| ⋮ | ⋮ |

FIG. 4C

| ATTRIBUTE | GRAPHIC TYPE : SEGMENT<br>COLOR : RED<br>LINE TYPE : SOLID LINE<br>LINE WIDTH : 1.0 |
|---|---|
| RANGE COORDINATE | LOCATION COORDINATE |
| (x9, y9), (x10, y10) | (x9, y9), (x10, y10) |

FIG. 7
PRIOR ART

| ATTRIBUTE | LOCATION COORDINATE |
|---|---|
| GRAPHIC TYPE : CURVILINEAR LINE<br>COLOR : YELLOW<br>LINE TYPE : BROKEN LINE<br>LINE WIDTH : 0.8 | (x01, y01), (x02, y02), (x03, y03), ... |
| GRAPHIC TYPE : SEGMENT<br>COLOR : RED<br>LINE TYPE : SOLID LINE<br>LINE WIDTH : 1.0 | (x9, y9), (x10, y10) |
| GRAPHIC TYPE : CIRCLE<br>COLOR : GREEN<br>LINE TYPE : ONE-DOT CHAIN LINE<br>LINE WIDTH : 0.6 | (xc, yc), R |
| GRAPHIC TYPE : CHARACTER<br>COLOR : BLUE<br>LINE WIDTH : 1.2 | (xd, yd), CHARACTER DATA |
| GRAPHIC TYPE : SEGMENT<br>COLOR : BLUE<br>LINE TYPE : SOLID LINE<br>LINE WIDTH : 1.0 | (x5, y5), (x6, y6) |
| ... | ... |

PROCESSING METHOD, PROCESSING APPARATUS, AND COMPUTER PROGRAM PRODUCT

This application is a continuation of PCT International Application No. PCT/JP02/13111 which has an International filing date of Dec. 13, 2002, which designated the United States of America.

BACKGROUND OF THE INVENTION

1. Field of the Invention

The present invention relates to a method of processing a graphic data using a CAD system in order to display a graphic image combining graphic elements such as curvilinear lines, segments, and circles, a processing apparatus employing the method, and a computer program product for realizing the processing apparatus with use of a general-purpose computer. Particularly, the present invention relates to a processing method, a processing apparatus, and a computer program product for determining the identity of two graphics.

2. Description of the Related Art

CAD (Computer Aided Design) systems have been marketed for processing graphic data to display a graphic image combining graphic elements such as curvilinear lines (free curves), segments, and circles.

As such graphic data are processed in different CAD systems, they are varied but not uniform in the data structure or the file format for representation. Therefore, the graphic data has different contents depending on the file format, even they are displaying same graphic images.

For standardization and digitalization of a variety of documents including graphic data to promote the data exchange over the public networks, the Ministry of Land, Infrastructure, and Transport in Japan adopted as a standard file format for official graphic documents the SXF format conforming to the ISO standard STEP/AP202 which was highly improved in the standardization and the neutralization and started from October in 2002.

However, every graphic data file specified as the SXF format is highly bulky in the data size and may hardly be practical as is heavy for use as the data file in a CAD system.

It is assumed that as a contractor wants to build a facility, it assigns a designer to design, a constructor to construct, and a maintainer to maintain the facility. A graphic data for the facility is created by the designer at a format for a CAD system of type A and then converted into an SXF format which is delivered to the contractor.

The graphic data of the SXF format is then supplied from the contractor to the constructor. The constructor then does various processing after converting the graphic data of the SXF format into a format for a CAD system of type B for the construction.

Also, the graphic data of the SXF format is supplied for the contactor to the maintainer. The maintainer then does various processing after converting the graphic data of the SXF into a format for a CAD system of type C for the maintenance.

It may particularly be desired to ensure the identity of graphic data at the discrete formats between the contractor, the designer, the constructor, and the maintainer or determine whether or not any illegal access or falsification is contained.

In addition, what graphics displayed by the graphic data are identical with each other means that the graphic elements such as curvilinear lines, segments, and circles constituting the graphic data are identical to those, and the same graphics can be outputted.

The conventional comparison between the graphic data is executed in the same CAD system using same file format. In practice, the graphic element data displaying the graphic elements constituting the graphic data are compared one by one.

FIG. 7 is an explanatory view schematically illustrating the graphic element data used for comparing the graphic data in a conventional manner.

As shown in FIG. 7, each of the graphic element data is represented as a record of the attribute of the graphic element such as graphic type, color, line type, and line width and a location coordinate indicating the position to be located and configuration represented by coordinates.

The graphic type of the graphic element is an information for representing graphic type such as curvilinear line, segment, and circle.

The color of the graphic element is an information for representing a color of the graphic element such as red, yellow, and green.

The line type of the graphic element is an information for representing the type of a line of the graphic element such as solid line, broken line, or one-dot chain line.

The line width of the graphic element is an information for representing the width of a line forming the graphic element such as 0.6, 0.8, and 1.0.

The location coordinate of the graphic element is an information for indicating the position to be located and configuration of the graphic element. When the graphic type of the graphic element is a segment, its two ends are represented by the coordinate. When the graphic type of the graphic element is a circle, its center is represented by the coordinate in combination with a radius. When the graphic type of the graphic element is a curvilinear line, its tracing points are represented by the coordinate.

When the graphic type of the graphic element is a character, its start point and the character train and the like become the location coordinate.

As the graphic element data displaying the graphic elements constituting the graphic data are compared one by one, the identity of the graphic data can be determined.

It may be essential to ensure the identity of graphic data not only for determining whether or not any illegal access mentioned above is done but also for judging the conversion of a file format from one to another with no error.

A system for determining the identity of graphic data by comparing the attributes (graphic parameters) of the graphic data (CAD data) is disclosed in, for example, Japanese Application Laid-open No. 6-83913(1994).

In the conventional method, however, it is not supposed that the graphic data between different formats such as between the format for CAD system of type A and the SXF format.

Also, since the graphic elements are compared one by one in each of the attribute of graphic type, color, line type, line width, and coordinates, the processing load such as processing time is considerably large.

Particularly, curvilinear line as the free curve needs a number of coordinates points for the comparison. In addition, the coordinates include decimals or fractional numbers other than integers. As a result, they will be processed only with an increase in the processing load.

As all the graphic elements are compared, the overall processing load will further be increased.

SUMMARY OF THE INVENTION

The present invention has been developed in view of the above circumferences and its primary object is to provide a processing method, a processing apparatus, and a computer program product capable of determining the identity of graphic data at different file formats with the use of an idea that comparison files where tables are recorded for sorting information relating to the graphic elements into separate attributes and then used for comparing the graphic elements.

It is another object of the present invention to provide a computer program product which allows the identity of graphic data to be judged by comparing the number of tables and the number of graphic elements included in the tables sorted into separate attributes, whereby the number of items to be compared can be reduced. Also, as the number to be compared is an integer but not a real number, the processing load such as processing time can successfully be reduced.

It is a further object of the present invention to provide a computer program product and the like in which the identity of graphic data is determined by comparing the range coordinates which represent the coordinates at two diagonal vertexes of a four-cornered shape by which each graphic element is circumscribed, thus significantly minimizing the processing load such as processing time due to the comparison at two coordinate points.

It is a still further object of the present invention to provide a computer program product and the like which allows the identity to be not executed whenever any discrepancy is found during the comparison of the number of tables, the number of graphic elements, and the range coordinate, hence permitting no redundant processing operation and decreasing the processing load such as processing time.

A processing method according to the first invention is a processing method for processing graphic data which displays a graphic formed by combining graphic elements, characterized by comprising the step of sorting, into separate attributes of the graphic elements, the information relating to the graphic elements which constitute the graphic data.

According to the processing method of the first invention, the graphic element data are sorted into separate attributes consisting of graphic type, color, line type, line width, and the like of the graphic elements constituting the graphic data and used for comparing the graphic data. As the identity of the graphic data is determined by comparing the graphic elements, the graphic data having different formats can be determined.

A processing apparatus according to the second invention is a processing apparatus for processing graphic data which displays a graphic formed by combining graphic elements, each graphic element being represented by a location coordinate which indicates the position to be located and configuration thereof, characterized by comprising: means for calculating a range coordinate representing coordinates of vertexes of a four-cornered shape which circumscribes each graphic element; and means for sorting, into separate attributes of the graphic elements, the location coordinates and the range coordinates of the graphic elements as the graphic element data for displaying the graphic elements which constitute the graphic data.

According to the processing apparatus of the second invention, the comparison files in which the location coordinates and range coordinates are separately recorded corresponding to the attributes can be created, and the comparison files can be used for comparison between the graphic data whose formats are different in the specification, respectively.

A processing apparatus of the third invention is characterized by, in the second invention, further comprising: comparing means for comparing a first table where the graphic element data for displaying graphic elements which constitute a first graphic data are sorted into separate attributes and a second table where the graphic element data for displaying graphic elements which constitute a second graphic data are sorted into separate attributes; and means for determining the identity of the first graphic data and the second graphic data based on the comparison result by the comparing means.

In the processing apparatus according to the third invention, the comparison file including the first tables created from the first graphic data and the comparison file including the second tables created from the second graphic data are compared from each other to judge the identity of the first and second graphic data. Accordingly, even if the graphic data whose formats are different in the specification, their identity can be judged by comparing their comparing files.

A computer program product according to the fourth invention is a computer program product for use in a computer to process graphic data which displays a graphic formed by combining graphic elements, each graphic element being represented by a location coordinate which indicates the position to be located and configuration thereof, wherein the computer program product comprises: a computer readable storage medium having computer readable program code means embodied therein, characterized in that the computer readable code means comprises instructions for: calculating a range coordinate representing coordinates of vertexes of a four-cornered shape which circumscribes each graphic element; and sorting, into separate attributes of the graphic elements, the location coordinates and the range coordinates of the graphic elements as the graphic element data for displaying the graphic elements which constitutes the graphic data.

According to the computer program product of the fourth invention, the comparison files in which the location coordinates and range coordinates are separately recorded corresponding to the attributes can be created, and the comparison files can be used for comparison between the graphic data whose formats are different in the specification, respectively.

A computer program product according to the fifth invention is characterized in that, in the fourth invention, the computer readable program code means further comprises instructions for:

comparing a first table where the graphic element data for displaying graphic elements which constitute a first graphic data are sorted into separate attributes and a second table where the graphic element data for displaying graphic elements which constitute a second graphic data are sorted into separate attributes; and determining the identity of the first graphic data and the second graphic data based on the comparison result.

In the computer program product of the fifth invention, the comparison file including the first tables created from the first graphic data and the comparison file including the second tables created from the second graphic data are compared from each other to judge the identity of the first and second graphic data. Accordingly, even if the graphic data whose formats are different in the specification, their identity can be judged by comparing their comparing files.

A computer program product according to the sixth invention is characterized in that, in the fourth invention, the computer readable program code means further comprises: a first instruction for comparing number of first tables where the graphic element data for displaying graphic elements which constitute a first graphic data are sorted into separate attributes and number of second tables where the graphic element data for displaying graphic elements which constitute a second graphic data are sorted into separate attributes; a second instruction for comparing, with respect to each corresponding attribute, number of the graphic elements represented by the graphic element data sorted in the first tables and number of the graphic elements represented by the graphic element data sorted in the second tables; a third instruction for comparing, with respect to each corresponding attribute, the range coordinates included in the graphic element data sorted in the first tables and the range coordinates included in the graphic element sorted in the second tables; an instruction for, when it is judged at the comparison in the third instruction that the range coordinates included in all graphic element data in all corresponding tables are identical, determining whether or not the graphic element data whose range coordinates match with each other are found in each of the tables; and a fourth instruction for, when it is judged that the graphic element data whose range coordinates match with each other are found in any table, comparing the location coordinates of the graphic elements sorted in the first tables corresponding to the attribute of the table and the location coordinates of the graphic elements sorted in the second tables corresponding to the same.

According to the computer program product of the sixth invention, the identity of graphic data is judged through the comparison of the number of tables sorted into separate attributes and the number of graphic elements sorted into separate attributes, thus decreasing the number of items to be compared. Also, as the number to be compared is an integer but not a real number, the processing load such as processing time needed for the comparison of graphic data can be minimized in comparison to compare real number location coordinates.

In addition, the identity of graphic data is carried out by comparing the range coordinate, also called an extent coordinate, which represents the coordinates of two diagonal vertexes of a four-cornered shape by which each graphic element is circumscribed. This allows any intricate graphic element such as a curvilinear line to be represented by two coordinate points for the comparison, thus significantly minimizing the processing load such as processing time.

Moreover, in the comparison of the graphic element data having predetermined attribute, when graphic element data having same range coordinate is recorded in the first table and the second table one by one, respectively, they can be judged to be identical to each other because there is less possibility that the two graphic elements are different while equal in the range coordinate, whereby no troublesome comparison between the location coordinates of the two graphic element data will be needed. Accordingly, as all of numerous location coordinates need not to be compared, the processing load such as processing time cab be reduced.

A computer program product according to the seventh invention is characterized in that, in the sixth invention, the computer readable program code means further comprises an instruction for, when it is judged at the comparison in the first, second, third, or fourth instructions that the comparison result is not coincident, determining that the first graphic and the second graphic are not identical to each other.

The computer program product of the seventh invention allows the identity to be not proved whenever any discrepancy is found during the comparison of the number of tables, the number of graphic elements, and the range coordinate. The comparing processing will be canceled at the moment when the identity is not proved but never continued for nothing, hence decreasing the processing load such as processing time.

A computer program product according to the eighth invention is characterized in that, in the fourth through seventh inventions, the attribute consists of graphic type, color, line type, and line width of the graphic element.

According to the computer program product of the eighth invention, the comparison files are created by sorting the graphic elements into separate attributes each of which consisting of graphic type, color, line type, line width, and the like of the graphic element. The comparison files are used for comparison to determine the identity of the graphic data having formats different in the specification.

BRIEF DESCRIPTION OF THE DRAWINGS

FIG. 2 is a flowchart showing a procedure for creating a comparison file of the processing apparatus of the present invention;

FIG. 4A, FIG. 4B and FIG. 4C are explanatory diagrams schematically showing attribute based tables included in the comparison files created by the processing apparatus of the present invention;

FIG. 7 is an explanatory diagram schematically illustrating the graphic element data which are used for comparing between graphic data in a conventional manner.

DETAILED DESCRIPTION OF THE PREFERRED EMBODIMENTS

Some embodiments of the present invention will be described in more detail referring to the relevant drawings.

Figure 1:
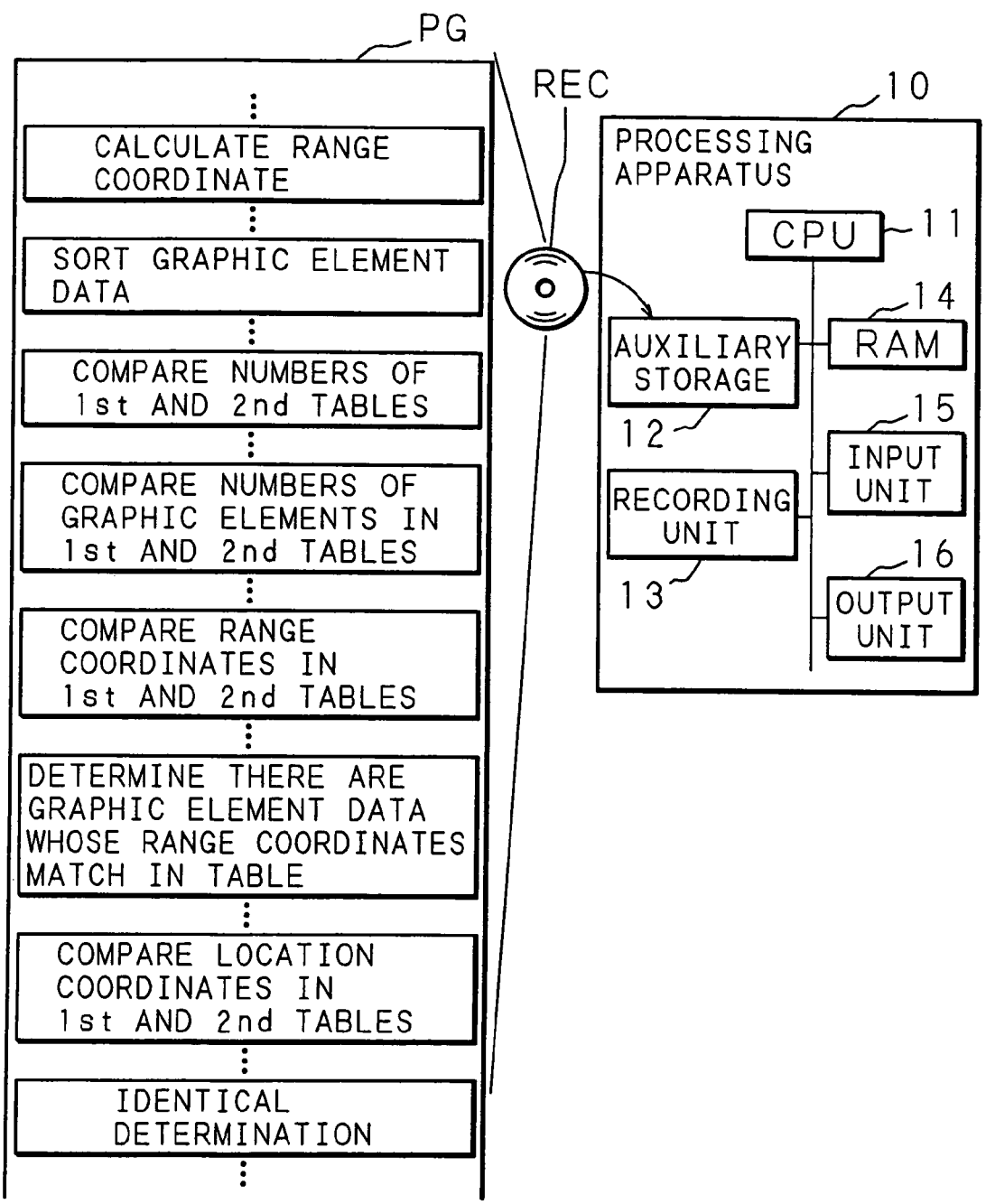
FIG. 1 is a block diagram showing a configuration of a processing apparatus according to the present invention.

FIG. 1 is a block diagram showing a configuration of a processing apparatus of the present invention.

In FIG. 1, reference numeral 10 denotes a processing apparatus used for a CAD (Computer Aided Design) system. The processing apparatus 10 is configured by a general-purpose computer including an auxiliary storage 12, such as a CD-ROM drive, for reading data from a recording medium REC, such as a CD-ROM, where a computer program PG for the processing apparatus of the present invention as well as other data are recorded, and a recording unit 13, such as a hard disk drive, for recording, e.g., the information read from the auxiliary storage 12.

By reading the computer program PG and other information such as data from the recording unit 13, temporarily storing in a RAM 14, and executing by a CPU 11, the computer operates as the processing apparatus 10 of the present invention.

The CPU 11 may be configured by single chip and also may be accompanied with a dedicated processor such as an image processor, so that high speed processing is realized.

The processing apparatus 10 also being provided with an input unit 15 such as a mouse, a tablet, and a keyboard, and an output unit 16 such as a monitor, a printer, and a plotter.

Stored in the recording unit 13 are the computer program PG and a computer program for a CAD which creates the graphic data displaying a graphic formed by combining the graphic elements such as curvilinear (free), segment, and circle. The computer program PG according to the present invention is used as a support tool for determining the identity of graphic data created by the computer program for the CAD.

The graphic data created by the computer program for the CAD comprises graphic elements such as curvilinear line, segment, and circle. The graphic element data for displaying the graphic element including informations such as an attribute and a location coordinate indicating a position to be located and configuration by coordinates.

The attribute of the graphic element data is an information which consists of graphic type, color, line type, line width, and the like of the graphic element.

The graphic type of the graphic element is an information representing a graphic type of the graphic element such as curvilinear line, segment, and circle.

The color of the graphic element is an information representing a color of the graphic element such as red, yellow, and green.

The line type of the graphic element is an information representing the type for forming a line of the graphic element such as solid line, broken line, or one-dot chain line.

The line width of the graphic element is an information representing the width of a line forming the graphic element such as 0.6, 0.8, and 1.0.

The location coordinate is an information of the coordinates indicating a position to be located and configuration of the graphic element. When the graphic element is a segment, its two ends are represented by the coordinates. When the graphic element is a circle, its center is represented by the coordinates in combination with a radius. When the graphic element is a curvilinear line, its tracing points are represented by the coordinates.

When the graphic type of the graphic element is a character, its start point and the character train and the like become the location coordinate.

The foregoing location coordinate for representing each graphic element are provided simply as an example and may be represented by any other location coordinate which can successfully specify the location and configuration of a graphic element, for example, a combination of a direction vector and start points coordinate for defining a segment or coordinates at three points for defining a circle.

The operation of the processing apparatus 10 of the present invention will now be described.

FIG. 2 is a flowchart of the operation of the processing apparatus 10 showing a procedure for creating comparison files.

When comparing the graphic data, the processing apparatus 10 of the present invention creates the comparison files for using comparison of the graphic data.

By controlling of the CPU 11 which executes the computer program PG stored in the RAM 14, the processing apparatus 10 calculates the range coordinate representing two diagonal vertexes of a four-cornered shape, such as a rectangle, which circumscribes a graphic element constituting the graphic data to be compared (S101).

Figure 3A:
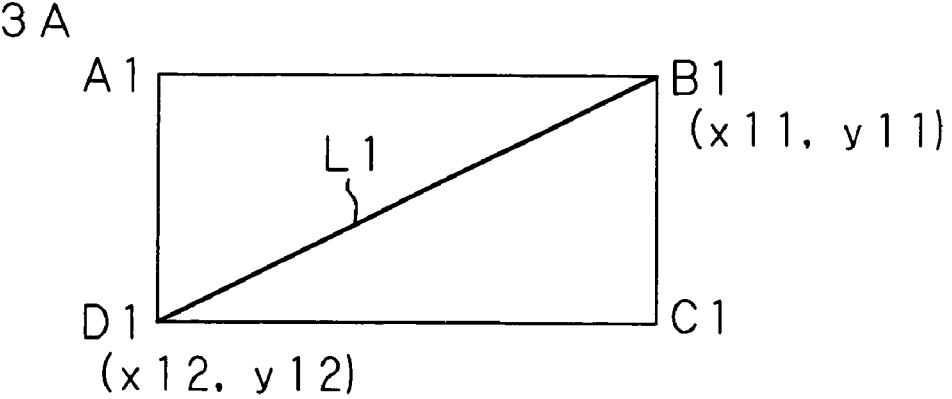
FIG. 3A, FIG. 3B and FIG. 3C are explanatory illustrations showing range coordinates calculated by the processing apparatus of the present invention.
Figure 3B:
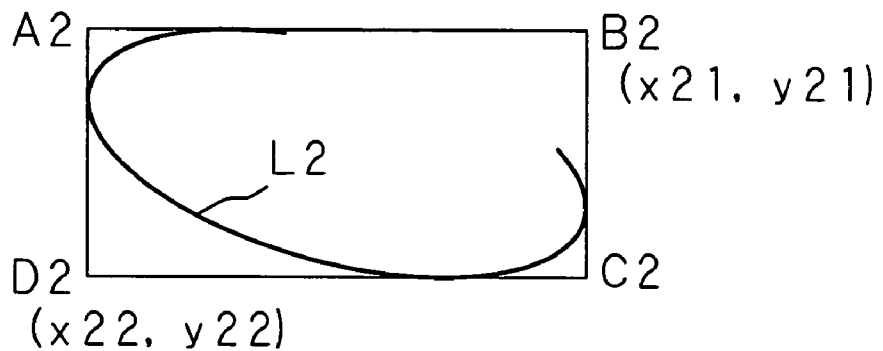
Figure 3C:
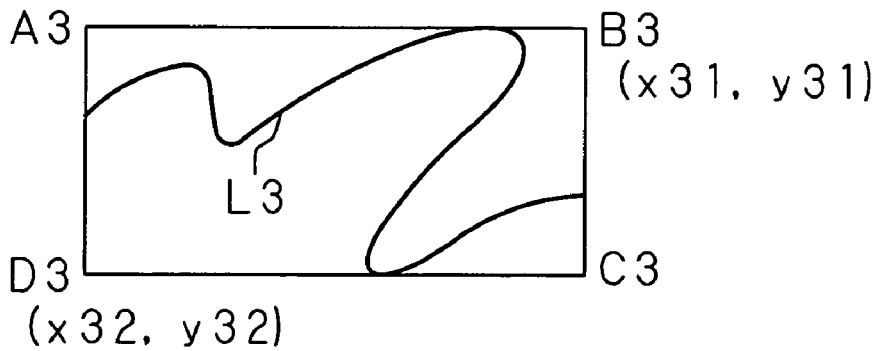

FIG. 3A, FIG. 3B and FIG. 3C are explanatory views illustrating the range coordinates calculated by the processing apparatus 10 of the present invention.

FIG. 3A shows the range coordinate of the graphic element whose graphic type is a segment.

The range coordinate in this embodiment is generally called as an extent coordinate. The extent coordinate represents coordinates of two diagonal vertexes of a four-cornered shape such as a rectangle which circumscribes the graphic element.

In an example shown in FIG. 3A, among four vertexes of a four-cornered shape A1, B1, C1 and D1 which circumscribes a segment L1, a coordinate (x11, y11) of the vertex B1 positioned at the top of right side and coordinate (x12, y12) of the vertex D1 positioned at the bottom of left side are calculated as the range coordinate.

FIG. 3B shows a range coordinate of the graphic element whose graphic type is a curvilinear line.

In FIG. 3B, among four vertexes of a four-cornered shape A2, B2, C2 and D2 which circumscribes a curvilinear line L2 as a curve line, a coordinate (x21, y21). of the vertex B2 positioned at the top of right side and coordinate (x22, y22) of the vertex D2 positioned at the bottom of left side are calculated as the range coordinate.

FIG. 3C illustrates a range coordinate of the graphic element whose graphic type is a curvilinear line.

In FIG. 3C, among four vertexes of a four-cornered shape A3, B3, C3 and D3 which circumscribes a curvilinear line L3 as a curve line, a coordinate (x31, y31) of the vertex B3 positioned at the top of right side and coordinate (x32, y32) of the vertex D3 positioned at the bottom of left side are calculated as the range coordinate.

As apparent from FIG. 3A, FIG. 3B, and FIG. 3C, any complicated line such as a curvilinear line can be represented by two coordinates using the range coordinate as same as a segment.

Since the range coordinate is explained as an orthogonal coordinate system in this embodiment, the four-cornered shape is a rectangle having four side arranged in parallel with the coordinate axes. If the coordinate system is not an orthogonal coordinate system, the four-cornered shape may be a four-cornered shape such as a parallelogram.

The rectangle is a four-cornered shape having four right angles and includes a square.

Returning to the flowchart, by controlling of the CPU 11 which executes the computer program PG stored in the RAM 14, the processing apparatus 10 sorts the location coordinates and the range coordinates as the graphic element data which displays the graphic element constituting the graphic data into separate attributes (S102). Then, the processing apparatus 10 creates a comparison file where the sorted graphic element data are recorded in attribute based tables each corresponding to each attribute of the graphic element data (S103). The processing apparatus 10 records the comparison file including the attribute based tables in the storage 13 (S104).

FIG. 4A, FIG. 4B, and FIG. 4C are explanatory views schematically illustrating the attribute based tables included in the comparison file created by the processing apparatus 10 of the present invention.

The table shown in FIG. 4A sorts the graphic element having the attribute of curvilinear line as the graphic type, yellow as the color, broken line as the line type, and 0.8 as the line width, and the location coordinate and the range coordinate of the graphic element having this attribute are recorded as the record.

The table shown in FIG. 4B sorts the graphic element having the attribute of segment as the graphic type, blue as the color, solid line as the line type, and 1.0 as the line width, and the location coordinate and the range coordinate of the graphic element having this attribute are recorded as the record.

The table shown in FIG. 4C sorts the graphic element having the attribute of segment as the graphic type, red as the color, solid line as the line type, and 1.0 as the line width, and the location coordinate and the range coordinate of the graphic element having this attribute are recorded as the record.

The number of tables created as described above corresponds to the number of attributes. Each table corresponding to each attribute includes the records corresponding to the number of the graphic elements of each attribute.

Figure 5:
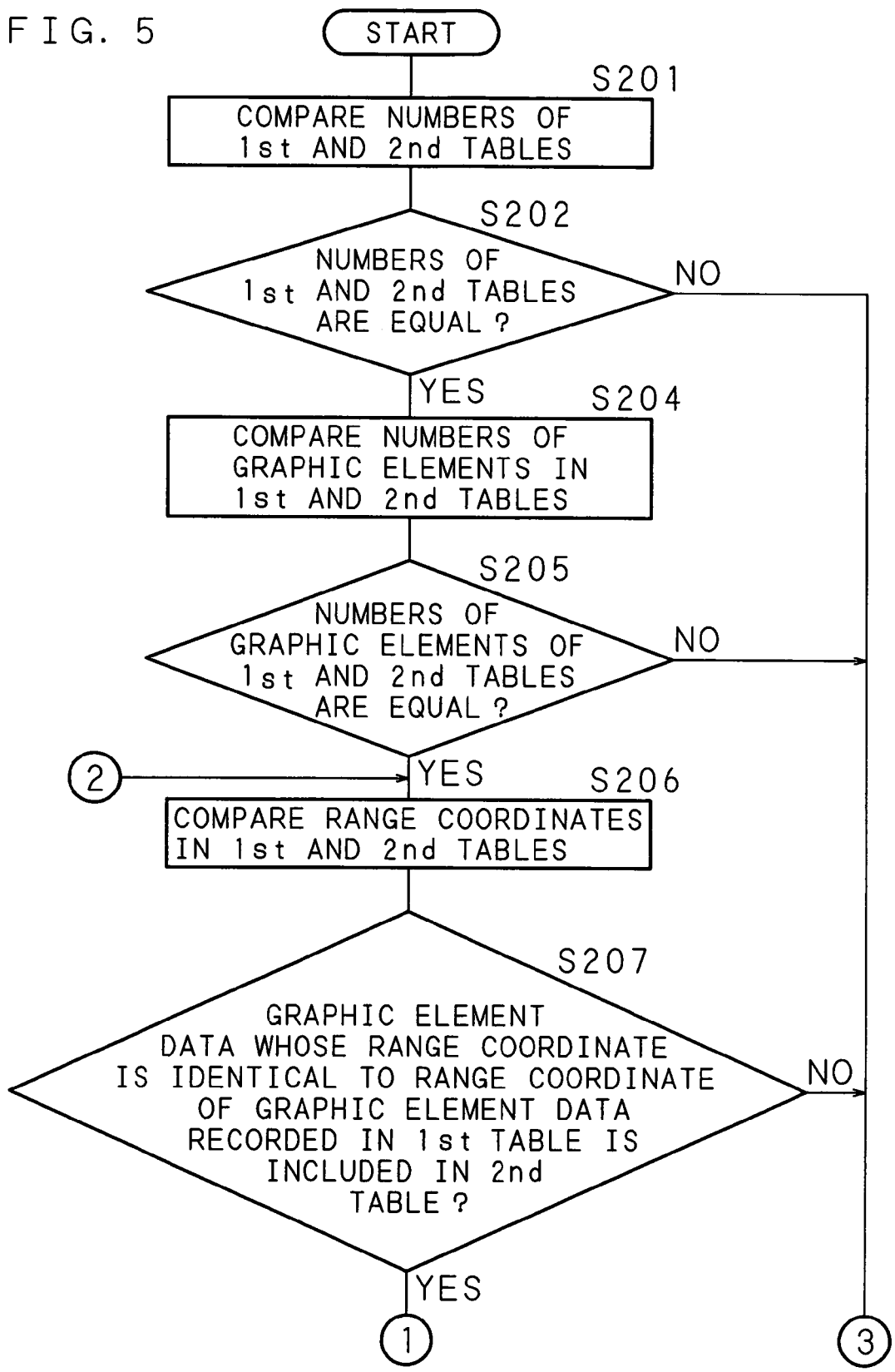
FIG. 5 is a flowchart showing a procedure for comparing the graphic data of the processing apparatus of the present invention.
Figure 6:
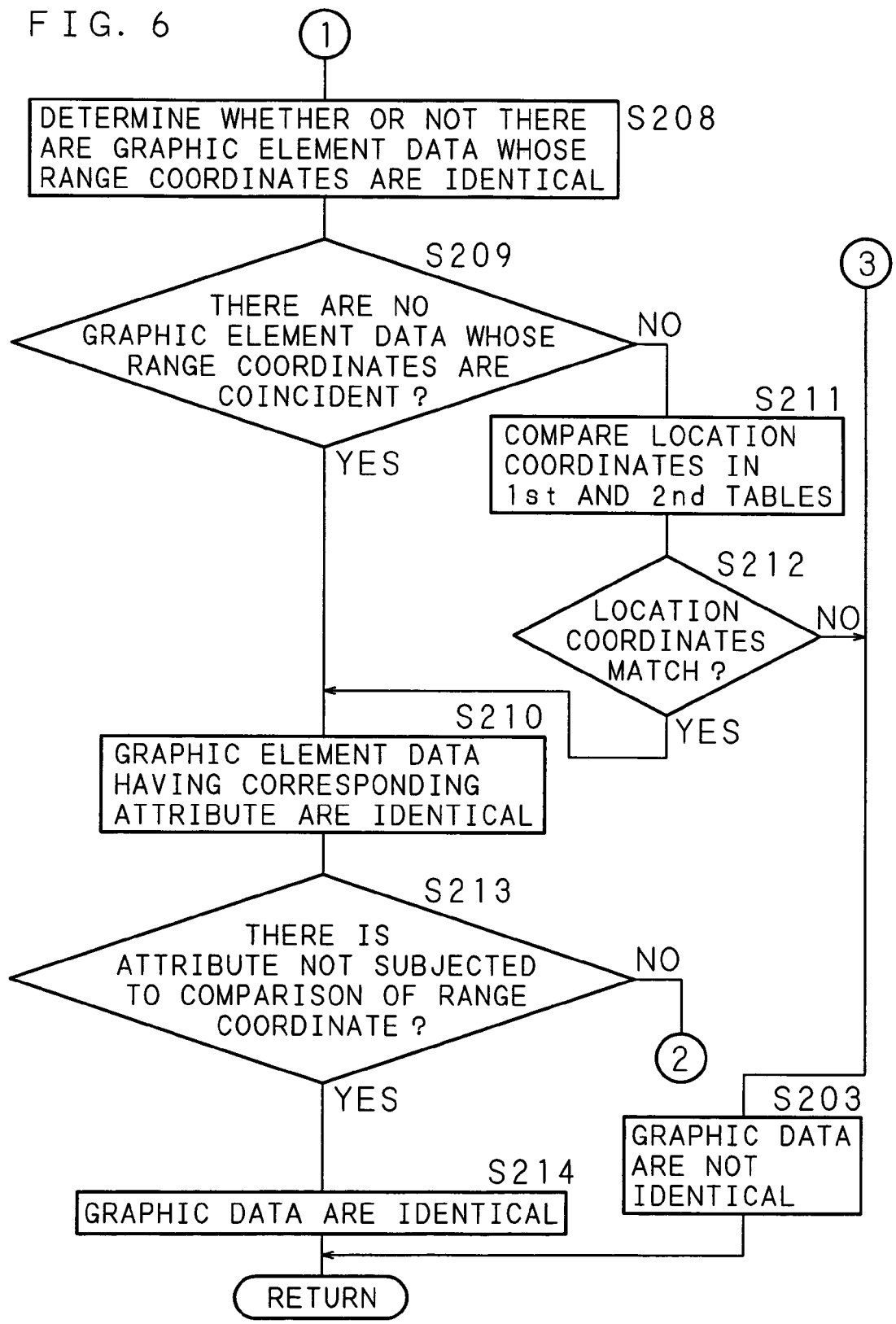
FIG. 6 is a flowchart showing a procedure for comparing the graphic data of the processing apparatus of the present invention.

FIG. 5 and FIG. 6 are flowcharts of a procedure of a graphic data comparison processing of the processing apparatus 10 according to the present invention.

The processing apparatus 10 according to the present invention determines the identity of the first graphic data and the second graphic data by comparing the first tables created from a first graphic data and the second tables created from a second graphic data.

By controlling of the CPU 11 which executes the computer program PG stored in the RAM 14, the processing apparatus 10 compares, with respect to each corresponding attribute, the number of first tables where the graphic element data displaying the graphic element constituting the first graphic data are sorted into separate attributes with the number of second tables where the graphic element data displaying the graphic element constituting the second graphic data are sorted into separate attributes (S201).

By controlling of the CPU 11 which executes the computer program PG stored in the RAM 14, the processing apparatus 10, when it is judged from the comparison result at Step S201 that the number of the first tables is different from the number of the second tables (NO at S202), determines that the first graphic data and the second graphic data are not identical with each other (S203), and terminates the comparing operation.

More specifically, it is determined that the first graphic data and the second graphic data are different from each other when their number of graphic elements constituting respective graphic data indicated by the number of tables are not identical.

Then, by controlling of the CPU 11 which executes the computer program PG stored in the RAM 14, the processing apparatus 10, when it is judged from the comparison result at Step S201 that the number of the first tables is equal to the number of the second tables (YES at S202), compares, with respect to each corresponding attribute, the number of the graphic elements represented by the graphic element data recorded in the first table and the number of the graphic elements represented by the graphic element data recorded in the second table (S204).

By controlling of the CPU 11 which executes the computer program PG stored in the RAM 14, the processing apparatus 10, when it is judged from the comparison result at Step S204 that the number of the graphic elements represented by the graphic element data recorded in the first table is not equal to the number of the graphic elements represented by the graphic element data recorded in the second table in any one of corresponding attribute (NO at S205), determines that the first graphic data and the second graphic data are not identical with each other (S203), and terminates the comparing operation.

More specifically, it is determines that the first graphic data and the second graphic data are different from each other when a difference in the number between the graphic elements is found at least at one attribute.

Then, by controlling of the CPU 11 which executes the computer program PG stored in the RAM 14, the processing apparatus 10, when it is judged that the number of the graphic elements represented by the graphic element data sorted in the first table is equal to the number of the graphic elements represented by the graphic element data sorted in the second table with respect to the corresponding attribute (YES at S205), compares, with respect to the corresponding attribute, the range coordinate included in the graphic element data sorted in the first table and the range coordinate included in the graphic element data sorted in the second table (S206).

By controlling of the CPU 11 which executes the computer program PG stored in the RAM 14, the processing apparatus 10, when it is judged from the comparison result at Step S206 that the graphic element data whose range coordinate is identical to the range coordinate of the graphic element data recorded in the first table is not included in the second table (NO at S207), determines that the first graphic data and the second graphic data are not identical with each other (S203), and terminates the comparing operation.

More particularly, it is judged about all graphic element data having same attribute whether or not the graphic element data whose range coordinate is identical to the range coordinate of the graphic element data included in one table is included in the other table. It is judged that the first graphic data and the second graphic data are different from each other when at least one graphic element data whose range coordinate is identical to the range coordinate of the graphic element data included in one first table is not include in the other table.

By controlling of the CPU 11 which executes the computer program PG stored in the RAM 14, the processing apparatus 10, when it is judged from the comparison result at Step S207 that, with respect to the corresponding attribute, all range coordinates of the graphic element data sorted in the first table are identical to that of the graphic data sorted in the second table (YES at S207), determines whether or not the graphic element data whose range coordinates are identical in each tables having corresponding attribute (S208).

By controlling of the CPU 11 which executes the computer program PG stored in the RAM 14, the processing apparatus 10, when it is judged from the comparison result at Step S208 that there is no graphic element data whose range coordinate are identical in each table having corresponding attribute (YES at S209), determines that the graphic elements sorted in the tables having corresponding attributes are identical (S210).

More specifically, even when there is no graphic element data whose range coordinates are identical, in other words, the range coordinate of the graphic element data are different from each other, the graphic elements having same attribute and the range coordinate may very rarely be different. Consequently, it is determined that all graphic elements sorted in the tables having corresponding attributes are identical.

Alternatively, by controlling of the CPU 11 which executes the computer program PG stored in the RAM 14, the processing apparatus 10, when it is judged from the comparison result at Step S208 that there is graphic element data whose range coordinates matches in the tables having corresponding attribute (NO at S209), compares with respect to the corresponding attribute, the location coordinates sorted in the first table and the location coordinates sorted in the second table (S211).

More particularly, when it is judged at Step S209 that the graphic elements whose range coordinates match, that is, there are plural graphic elements whose range coordinates match in the table having corresponding attribute, all informations about the graphic element have to be compared.

By controlling of the CPU 11 which executes the computer program PG stored in the RAM 14, the processing apparatus 10, when it is judged from the comparison result at Step S211 that the location coordinate does not match (NO at S212), determines that the first graphic data and the second graphic data are not identical with each other (S203), and terminates the comparing operation.

Alternatively, by controlling of the CPU 11 which executes the computer program PG stored in the RAM 14, the processing apparatus 10, when it is judged from the comparison result at Step S211 that the location coordinates match (YES at S212), determines that all graphic elements recorded in the tables having corresponding attribute are identical (S210).

By controlling of the CPU 11 which executes the computer program PG stored in the RAM 14, the processing apparatus 10, judges, after the determination at Step S210 where the graphic elements sorted in the tables having corresponding attribute are identical, whether any attribute is not subjected to the comparison in the range coordinate after Step S206 (S213). When it is judged that there is the attribute not subjected to the comparison of the range coordinate (YES at S213), shifts the procedure to Step S206 where the same procedure is repeated for the graphic element data recorded in the table whose attribute is not compared in the range coordinate.

Alternatively, by controlling of the CPU 11 which executes the computer program PG stored in the RAM 14, the processing apparatus 10, when it is judged from the comparison result as Step S213 that there is no attribute subjected to the comparison in the range coordinate (NO at S213), determines that all graphic element data in all tables are identical, and determines that the first graphic data and the second graphic data are identical (S214), and terminates the comparing operation.

In addition, even if the comparison of the range coordinate at Step S206 and the comparison of the location coordinates at Step S211 are not perfectly resulted, it is allowable when a discrepancy is within the predetermined error range.

It is based on the fact that the coordinates are represented by real values but not integers and they may have any error inevitably created during the conversion of the graphic data from one format to another.

Since the identity of the graphic data are compared, the contractor, when assigns a designer to design, a constructor to construct, and a maintainer to maintain its facility, can share with them the graphic data of the facility which are different between the file format at a CAD system created by the designer, the file format transferred from the designer to the contractor, the file format transferred from the contractor to the constructor and converted by the constructor, and the file format transferred from the contractor to the maintainer and converted by the maintainer, hence ensuring that no falsification is found in the graphic data.

Also, when one file format of a graphic data is converted into another format of a graphic data and then reconverted back from the another format, the accuracy of the conversion can be determined through the foregoing processing of the comparison between the graphic data at the one file format and the graphic data at the another file format.

As its embodiment described above is simply illustrative for ease of the understanding, the present invention may be applied to other modifications without departing from the scopes and spirits defined in the claims.

As set forth above, the processing method, the processing apparatus, and the computer program product according to the present invention are featured in that the location coordinate and the range coordinate which indicates the position to be located and configuration as the coordinates are stored corresponding to an attribute which consists of graphic type, color, line type, line width, and the like of the graphic element constituting the graphic data created by the CAD system for processing the graphic data displaying the graphics by combining the graphic elements, and the sorted location coordinates and range coordinates are recorded as the comparison files each having the attribute based tables. Accordingly, the comparison files can be used with higher effectiveness for comparing the graphic data between the different formats.

The present invention allows the identity of graphic data to be judged through the comparison of the number of tables and the number of graphic elements sorted into respective attributes, thus decreasing the number of items to be compared. Also, as the number to be compared is an integer but not a real number by which the coordinate is represented, the comparing operation for graphic data can successfully be minimized in the time consumption or operating load.

In addition, the identity of graphic data is carried out by comparing the range coordinate, also called an extent coordinate, which represents the coordinates at two diagonal vertexes of a four-cornered shape by which each graphic element is represented. This allows any intricate graphic element such as a curvilinear line to be represented at two coordinate points for the comparison, thus significantly minimizing the time consumption or operating load.

Moreover, in the operation of comparing the graphic elements of the predetermined attribute, when two graphic element data which are equal in the range coordinate are recorded in the first table and the second table, respectively having corresponding attribute, they can be determined to be identical to each other because there is less possibility that the two graphic elements are different while equal in the range coordinate, whereby no troublesome comparison between the location coordinates of the two graphic elements will be needed. Accordingly, as the location coordinates of each graphic element need not to be involved for the comparing operation, the overall processing time or operating load cab be reduced.

Finally, the present invention allows the identity to be not proved whenever any discrepancy is found during the comparison of the number of tables, the number of graphic elements, and the range coordinate. The comparing operation will be terminated at the moment when the identity is not proved but never continued for nothing, hence decreasing the overall processing time or operating load.

The invention claimed is:

1. A processing apparatus for processing graphic data which displays a graphic formed by combining graphic elements, each graphic element being represented by a location coordinate which indicates the position to be located and configuration thereof, comprising:

a calculating unit that calculates a range coordinate representing coordinates of vertexes of a four-cornered shape which circumscribes each graphic element; and a sorting unit that sorts, into separate attributes of the graphic elements, the location coordinates and the range coordinates of the graphic elements as the graphic element data for displaying the graphic elements which constitute the graphic data;

a first comparing unit that compares number of first tables where the graphic element data for displaying graphic elements which constitute a first graphic data are sorted into separate attributes and number of second tables where the graphic element data for displaying graphic elements which constitute a second graphic data are sorted into separate attributes;

a second comparing unit that compares, with respect to each corresponding attribute, number of the graphic elements represented by the graphic element data sorted in said first tables and number of the graphic elements represented by the graphic element data sorted in said second tables;

a third comparing unit that compares with, respect to each corresponding attribute, the range coordinates included in the graphic element data sorted in said first tables and the range coordinates included in the graphic element sorted in said second tables;

a determining unit that determines whether or not the graphic element data whose range coordinates match with each other are found in each of the tables, when it is judged that the range coordinates included in all graphic element data in all corresponding tables are identical; and a fourth comparing unit that compares the location coordinates of the graphic elements sorted in said first tables corresponding to the attribute of said table and the location coordinates of the graphic elements sorted in said second tables corresponding to the same, when it is judged that the graphic element data whose range coordinates match with each other are found in any table.

2. The processing apparatus as set forth in claim 1, further comprising:

a comparing unit that compares a first table where the graphic element data for displaying graphic elements which constitute a first graphic data are sorted into separate attributes and a second table where the graphic element data for displaying graphic elements which constitute a second graphic data are sorted into separate attributes; and a determining unit that determines the identity of the first graphic data and the second graphic data based on the comparison result by said comparing means.

3. A processing apparatus for processing graphic data which displays a graphic formed by combining graphic elements, each graphic element being represented by a location coordinate which indicates the position to be located and configuration thereof, comprising a processor being capable of performing following operations of:

calculating a range coordinate representing coordinates of vertexes of a four-cornered shape which circumscribes each graphic element; and sorting, into separate attributes of the graphic elements, the location coordinates and the range coordinates of the graphic elements as the graphic element data for displaying the graphic elements which constitute the graphic data;

comparing number of first tables where the graphic element data for displaying graphic elements which constitute a first graphic data are sorted into separate attributes and number of second tables where the graphic element data for displaying graphic elements which constitute a second graphic data are sorted into separate attributes;

comparing, with respect to each corresponding attribute, number of the graphic elements represented by the graphic element data sorted in said first tables and number of the graphic elements represented by the graphic element data sorted in said second tables;

comparing, with respect to each corresponding attribute, the range coordinates included in the graphic element data sorted in said first tables and the range coordinates included in the graphic element sorted in said second tables;

determining whether or not the graphic element data whose range coordinates match with each other are found in each of the tables, when it is judged that the range coordinates included in all graphic element data in all corresponding tables are identical; and comparing the location coordinates of the graphic elements sorted in said first tables corresponding to the attribute of said table and the location coordinates of the graphic elements sorted in said second tables corresponding to the same, when it is judged that the graphic element data whose range coordinates match with each other are found in any table.

4. The processing apparatus as set forth in claim 3, wherein said processor is further capable of performing following operations of:

comparing a first table where the graphic element data for displaying graphic elements which constitute a first graphic data are sorted into separate attributes and a second table where the graphic element data for displaying graphic elements which constitute a second graphic data are sorted into separate attributes; and determining the identity of the first graphic data and the second graphic data based on the comparison result by the comparison result.

5. A computer program product for use in a computer to process graphic data which displays a graphic formed by combining graphic elements, each graphic element being represented by a location coordinate which indicates the position to be located and configuration thereof, wherein the computer program product comprises:

a computer readable storage medium having computer readable program code means embodied therein, said computer readable code means comprising:

an instruction for calculating a range coordinate representing coordinates of vertexes of a four-cornered shape which circumscribes each graphic element;

an instruction for sorting, into separate attributes of the graphic elements, the location coordinates and the range coordinates of the graphic elements as the graphic element data for displaying the graphic elements which constitutes the graphic data;

a first instruction for comparing number of first tables where the graphic element data for displaying graphic elements which constitute a first graphic data are sorted into separate attributes and number of second tables where the graphic element data for displaying graphic elements which constitute a second graphic data are sorted into separate attributes;

a second instruction for comparing, with respect to each corresponding attribute, number of the graphic elements represented by the graphic element data sorted in said first tables and number of the graphic elements represented by the graphic element data sorted in said second tables;

a third instruction for comparing, with respect to each corresponding attribute, the range coordinates included in the graphic element data sorted in said first tables and the range coordinates included in the graphic element sorted in said second tables;

an instruction for, when it is judged at the comparison in said third instruction that the range coordinates included in all graphic element data in all corresponding tables are identical, determining whether or not the graphic element data whose range coordinates match with each other are found in each of the tables; and a fourth instruction for, when it is judged that the graphic element data whose range coordinates match with each other are found in any table, comparing the location coordinates of the graphic elements sorted in said first tables corresponding to the attribute of said table and the location coordinates of the graphic elements sorted in said second tables corresponding to the same.

6. The computer program product as set forth in claim 5, wherein the attribute consists of graphic type, color, line type, and line width of the graphic element.

7. The computer program product as set forth in claim 5, wherein the computer readable program code means further comprises an instruction for, when it is judged at the comparison in the first, second, third, or fourth instructions that the comparison result is not coincident, determining that the first graphic and the second graphic are not identical to each other.

8. The computer program product as set forth in claim 7, wherein the attribute consists of graphic type, color, line type, and line width of the graphic element.

9. Method for use in a computer to process graphic data which displays a graphic formed by combining graphic elements, each graphic element being represented by a location coordinate which indicates the position to be located and configuration thereof, the method comprising:

- acquiring tables where graphic element data for displaying graphic elements which constitute the graphic data are sorted into separate attributes, the graphic element data including a range coordinate representing coordinates of vertexes of a four-cornered shape which circumscribes the graphic element which constitutes a first graphic data stored in a first table, the graphic element data including the location coordinates;
- comparing number of first tables where the graphic element data for displaying graphic elements which constitute a first graphic data are sorted into separate attributes and number of second tables where the graphic element data for displaying graphic elements which constitute a second graphic data are sorted into separate attributes;
- comparing, with respect to each corresponding attribute, number of the graphic elements represented by the graphic element data sorted in said first tables and number of the graphic elements represented by the graphic element data sorted in said second tables;
- comparing, with respect to each corresponding attribute, the range coordinates included in the graphic element data sorted in said first tables and the range coordinates included in the graphic element sorted in said second tables;
- determining whether or not the graphic element data whose range coordinates match with each other are found in each of the tables, when it is judged that the range coordinates included in all graphic element data in all corresponding tables are identical; and
- comparing the location coordinates of the graphic elements sorted in said first tables corresponding to the attribute of said table and the location coordinates of the graphic elements sorted in said second tables corresponding to the same, when it is judged that the graphic element data whose range coordinates match, with each other are found in any table.

* * * * *

UNITED STATES PATENT AND TRADEMARK OFFICE
CERTIFICATE OF CORRECTION

| | | |
|---|---|---|
| PATENT NO. | : 7,554,547 B2 | Page 1 of 1 |
| APPLICATION NO. | : 11/147428 | |
| DATED | : June 30, 2009 | |
| INVENTOR(S) | : Mari Omura | |

It is certified that error appears in the above-identified patent and that said Letters Patent is hereby corrected as shown below:

Col. 15, line 11, In claim 9, delete "Method" and insert --A method--, therefor.

Signed and Sealed this
Eleventh Day of October, 2011

David J. Kappos
*Director of the United States Patent and Trademark Office*